United States Patent
Dautel et al.

(10) Patent No.: US 11,732,620 B2
(45) Date of Patent: Aug. 22, 2023

(54) COMBINED PLUG-SENSOR WHEEL FOR A CAMSHAFT

(71) Applicant: Mahle International GmbH, Stuttgart (DE)

(72) Inventors: Frank Dautel, Gerlingen (DE); Peter Mantler, Leutenbach (DE); Christoph Steinmetz, Ludwigsburg (DE)

(73) Assignee: Mahle International

( * ) Notice: Subject to any disclaimer, the term of this patent is extended or adjusted under 35 U.S.C. 154(b) by 0 days.

(21) Appl. No.: 17/877,800

(22) Filed: Jul. 29, 2022

(65) Prior Publication Data
US 2023/0031247 A1 Feb. 2, 2023

(30) Foreign Application Priority Data
Jul. 30, 2021 (DE) ......................... 102021208281.5

(51) Int. Cl.
*F01L 1/047* (2006.01)
*F01L 1/46* (2006.01)
*F01L 13/00* (2006.01)

(52) U.S. Cl.
CPC ............... *F01L 1/047* (2013.01); *F01L 1/46* (2013.01); *F01L 2001/0475* (2013.01); *F01L 2013/111* (2013.01); *F01L 2301/00* (2020.05); *F01L 2820/041* (2013.01)

(58) Field of Classification Search
CPC ..... F01L 1/047; F01L 2001/0475; F01L 1/46; F01L 2013/111; F01L 2301/00; F01L 2820/041
USPC ........................................... 123/90.17, 90.27
See application file for complete search history.

(56) References Cited

U.S. PATENT DOCUMENTS

| | | | |
|---|---|---|---|
| 7,013,854 B1 * | 3/2006 | Heintzen | F01L 1/3442 123/90.15 |
| 7,621,245 B2 | 11/2009 | Lechner | |
| 8,590,499 B2 | 11/2013 | Ilgeroth | |
| 10,393,241 B2 | 8/2019 | Kunz | |
| 10,711,658 B1 * | 7/2020 | Bell | F01L 1/3442 |
| 2014/0165935 A1 | 6/2014 | Gerlingen | |
| 2015/0184555 A1 * | 7/2015 | Lettmann | F01L 1/047 123/90.6 |
| 2017/0342875 A1 * | 11/2017 | Boyle | F01L 1/047 |

FOREIGN PATENT DOCUMENTS

| | | | | |
|---|---|---|---|---|
| DE | 19703821 A1 * | 8/1998 | | C23C 22/07 |
| DE | 102006000846 A1 | 7/2007 | | |
| DE | 102008007091 A1 | 8/2009 | | |
| DE | 102011052819 A1 | 2/2013 | | |
| DE | 102012223811 A1 | 6/2014 | | |
| DE | 102013222413 A1 * | 5/2015 | | B23P 15/00 |
| DE | 102013223685 A1 | 5/2015 | | |

OTHER PUBLICATIONS

German Search Report for DE-102021208281.5, dated Mar. 9, 2022.
English abstract for DE-102013223685.

* cited by examiner

*Primary Examiner* — Jorge L Leon, Jr.
(74) *Attorney, Agent, or Firm* — Fishman Stewart PLLC

(57) ABSTRACT

A combined plug-sensor wheel for a camshaft is disclosed. The combined plug-sensor wheel includes a pin projecting in an axial direction of the camshaft. The pin, when inserted into the camshaft, seals the camshaft in a fluid-tight manner. According to an implementation, the combined plug-sensor wheel and the camshaft are incorporated into an internal combustion engine.

16 Claims, 1 Drawing Sheet

COMBINED PLUG-SENSOR WHEEL FOR A CAMSHAFT

CROSS-REFERENCE TO RELATED APPLICATION

This application claims priority to German Application No. DE 10 2021 208 281.5 filed on Jul. 30, 2021, the contents of which are hereby incorporated by reference in its entirety.

TECHNICAL FIELD

The present invention relates to a combined plug-sensor wheel for a camshaft. In addition, the invention relates to a camshaft having such a combined plug-sensor wheel and to an internal combustion engine having such a camshaft.

BACKGROUND

In order to be able for example to control valve opening times, modern camshafts are designed hollow and contain an oil reservoir via which for example a phase adjuster is actuated. Here it is important that an undesirable and uncontrolled leakage of oil in places not provided for this purpose is absolutely avoided. For this purpose, for example plugs are employed which in turn are inserted into the camshaft at the longitudinal end side for example by way of a press-fit or thermal joining fit and, via the press-fit, are tightly connected to the same. Alternatively, a pressing-together is obviously also conceivable.

From DE 10 2012 223 811 A1 a camshaft of an internal combustion engine having at least one function device connected via a shaft-hub connection to the same is known. Here, the function device comprises at least two different function elements which in turn fulfil different functions.

From DE 10 2013 223 685 A1 a closing plug for a camshaft having a sealing cap arranged transversely to a rotary axis of the camshaft in the same is known. Between the closing plug and the sealing cap at least one spacer running in the axial direction for maintaining a specified distance between the closing plug and the sealing cap is provided. This is to offer as simple and cost-effective a possibility for sealing an oil conducting region, which reliably prevents a closure of the oil line.

Disadvantageous in the camshafts known from the prior art however is that these, now as before, are often sealed with separate plugs which is complex and expensive.

The present invention therefore deals with the problem of stating a combined plug-sensor wheel which overcomes the disadvantages known from the prior art.

According to the invention, this problem is solved through the subject of the independent claim(s). Advantageous embodiments are subject of the dependent claims.

SUMMARY

The present invention is based on the general idea of stating for the first time a combined plug-sensor wheel for a camshaft having a pin projecting in the axial direction, which when inserted into the camshaft seals the same in a fluid-tight manner. With the combined plug-sensor wheel according to the invention it is thus possible to combine two functions in a common component, namely on the one hand the function of a sensor wheel, via which an angle-of-rotation position of the respective camshaft and thus a valve opening position can be detected, and on the other hand a plug for tightly sealing a hollow camshaft tube. By way of the combined plug-sensor wheel a separate assembly of a sensor wheel and of a plug can be omitted, as a result of which the assembly of a camshaft and thus also of an internal combustion engine equipped with such a camshaft can be configured simpler and more cost-effectively. In addition, by combining the plug and the sensor wheel in the combined plug-sensor wheel according to the invention, the production of the same can also be simplified in particular since two separate production processes required in the past can now be combined.

In an advantageous further development of the solution according to the invention, the plug-sensor wheel is produced from sinter metal, from plastic or from steel. During sintering, metallic but also ceramic materials are heated under high pressure, wherein however the temperature reached in the process remains below the respective melting temperature of the main material, as a result of which the shape is retained. With sintering processes it is possible to combine starting materials, which cannot be combined in any other manner to form a common material or only with difficulty so. Plastics can also be employed here or hybrid components made of plastic and metal, wherein in particular plastics have the major advantage that these cannot only be produced cost-effectively, but also so as to be light in weight and tight. A design out of steel makes possible a particularly robust production with a high wear resistance.

Practically, an axial length $L_Z$ of the pin of the combined plug-sensor wheel amounts to between 20 and 40% of the diameter $D_Z$ of the pin. Particularly practically, the axial length $L_Z$ amounts to at least 4 mm here. By way of this, an adequately large joining area with an inner lateral surface of a camshaft tube of the camshaft and thus a sufficiently firm connection can thus be created. For sensor wheels there are for example requirements for minimum torsion moments to be transmitted or axial displacement forces. The limitation of the axial length of the pin to the mentioned region illustrates requirements taking into account technically necessary chamfers (joining chamfers) on the camshaft tube and the combined plug-sensor wheel including joining gaps that materialise between camshaft tube and in this case geometry of the plug-sensor wheel. In addition, the use of material for forming the pin is reduced by the limitation of the length of the pin.

In a further advantageous embodiment of the solution according to the invention the pin is designed hollow. Through the hollow design of the pin, also called cupping, material can be saved and thus a conservation of resources achieved, as well as a weight saving, which in particular when operating an internal combustion engine equipped with such a camshaft in a motor vehicle contributes to a reduced fuel consumption.

Practically, the plug-sensor wheel is formed integrally. By using the previously mentioned materials for producing the combined plug-sensor wheel an integral design is opportune, for example as a metallic plug-sensor wheel or such a plug-sensor wheel made of plastic. In particular for the production out of plastic a plastic injection moulding process in turn is opportune.

Practically, an introduction chamfer is arranged or provided at a free end of the pin of the combined plug-sensor wheel. Such an introduction chamfer facilitates inserting or pressing the plug-sensor wheel with its pin into the hollow camshaft tube and prevents in particular a canting during insertion, which could for example result in damage.

Practically, an undercut or a fillet radius is provided at a transition from the pin to the sensor wheel. By way of this, a possible notching tendency can be reduced, which has a positive effect on the longevity of the combined plug-sensor wheel according to the invention. Such an undercut or such a fillet radius can also create an improved accessibility to an internal chamfer of the camshaft tube if applicable for necessary processing steps, or be due to sintering reasons.

Further, the present invention is based on the general idea of stating a camshaft having a hollow camshaft tube and having at least one plug-sensor wheel inserted in the same at an end side according to the preceding paragraphs. Compared with camshafts having separate sensor wheels and separate plugs known to date from the prior art, this camshaft can be produced more cost-effectively since the assembly of the combined plug-sensor wheel can take place in a single production step and not, as in the past, in two separate production steps.

Practically, the camshaft or its camshaft tube and the plug-sensor wheel are pressed together, bonded, press-fit stemmed, welded or soldered. In particular, pressing-together makes possible a quick, reliable and firm connection of the combined plug-sensor wheel with the camshaft tube. Alternatively a bonding is obviously also conceivable which offers the major advantage that greater dimensional tolerances, such as for example compared to a press-fit, are tolerable. Welding, for example by way of a friction-welded connection, is also conceivable.

Further, the present invention is based on the general idea of equipping an internal combustion engine having a camshaft described in the preceding paragraphs and thereby imparting the advantages described with respect to the camshaft also to the internal combustion engine. Here, the advantages consist in particular in a lower parts variety and a tightened assembly process, as a result of which the internal combustion engine as a whole can be produced more quickly and more cost-effectively.

Further important features and advantages of the invention are obtained from the subclaims, from the drawings and from the associated figure description by way of the drawings.

It is to be understood that the features mentioned above and still to be explained in the following cannot only be used in the respective combination stated but also in other combinations or by themselves without leaving the scope of the present invention.

Preferred exemplary embodiments of the invention are shown in the drawings and are explained in more detail in the following description, wherein same reference numbers relate to same or similar or functionally same components.

BRIEF DESCRIPTION OF THE DRAWINGS

There it shows, in each case schematically

DETAILED DESCRIPTION

Figure 1:
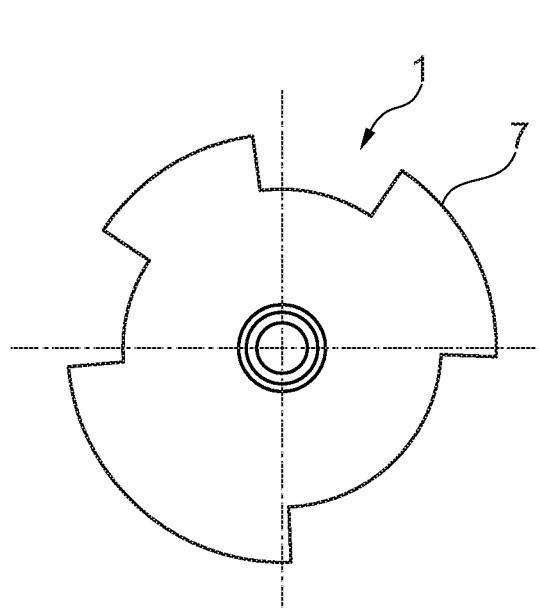
FIG. 1 a front view of a combined plug-sensor wheel according to the invention.
Figure 2:
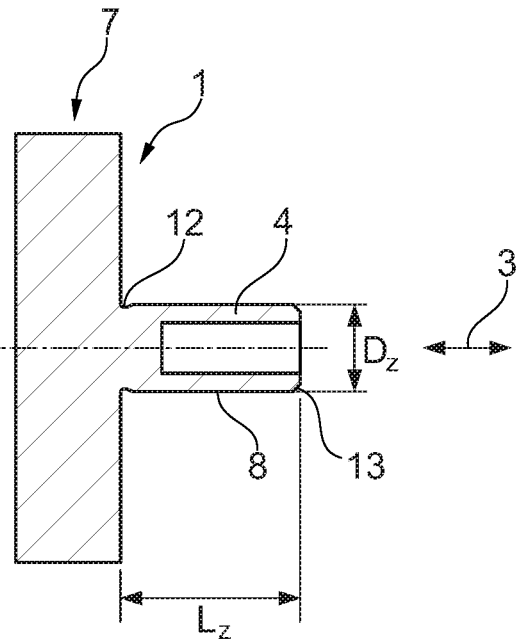
FIG. 2 a sectional representation through the combined plug-sensor wheel according to the invention, FIG. 3 a sectional representation through a camshaft having such a combined plug-sensor wheel according to the invention.
Figure 3:
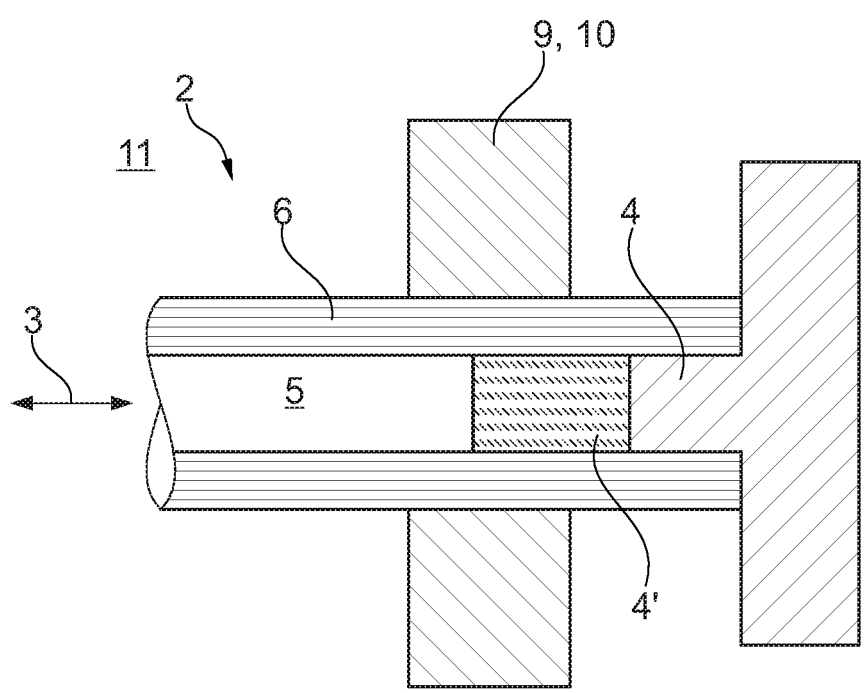

According to the FIGS. 1 to 3, a plug-sensor wheel 1 for a camshaft 2 (see FIG. 3) according to the invention comprises a pin for projecting in the axial direction 3, which when inserted into the camshaft 2 (see FIG. 3) seals the latter in a fluid-tight manner. By way of this, an interior 5 of a camshaft tube 6 of the camshaft 2 can be sealed so as to be fluid-tight, in particular oil-tight, as a result of which the interior 5 can also receive pressurised oil for example for the phase adjusting of the camshaft 2 without leakage. Through the combination of a sensor wheel 7 with a plug 8 (pin 4) according to the invention to form the combined plug-sensor wheel 1 according to the invention, two functions, namely on the one hand a detection of an angle-of-rotation position of the camshaft 2 and on the other hand a sealing of the interior 5 of the camshaft tube 6 can be combined in a common component. By way of this, only a single, namely common, production process is required, as a result of which the combined plug-sensor wheel 1 according to the invention, compared with two components produced separately, namely a plug 8 and a sensor wheel 7, can be produced significantly more cost-effectively. By combining the two components 7, 8 the storage and logistical costs as well as the assembly costs are also reduced, since merely the combined plug-sensor wheel 1 has to be assembled on the camshaft tube 6 in a production step.

The plug-sensor wheel 1 is preferentially produced integrally, for example from a sinter material, from plastic or from steel. By way of this, a high-quality and cost-effective production can be achieved.

An axial length $L_Z$ of the pin 4 amounts to between 20 and 40% of the diameter $D_Z$ of the pin 4, by way of which a sufficiently large joining area with the camshaft tube 6 is achieved.

Viewing the FIG. 3 it is noticeable that the pin 4 can still comprise an optional longer region 4', which reaches in particular under a function element 9 adjacent to the sensor wheel 7 of the combined plug-sensor wheel 1, for example cam 10.

Viewing FIG. 2 of the combined plug-sensor wheel 1 according to the invention, it is noticeable on the pin 4 that the same is formed hollow, for example includes a so-called cupping, by way of which not only material and thus resources can be saved, but at the same time, also weight are saved and thus upon an application of the plug-sensor wheel 1 according to the invention in an internal combustion engine 11, a reduction of the fuel consumption is made possible.

In order to definitely achieve a reliable sealing of the interior 5 of the camshaft tube 6, the axial length $L_Z$ can amount to at least 4 mm. A connection between the combined plug-sensor wheel 1 and the camshaft 2 or the camshaft tube 6 of the latter can take place for example by way of pressing, press-fit stemming, bonding, soldering or welding. A positive-locking connection is also conceivable as is a thermal joining. Here, a press-fit in particular makes possible connecting the combined plug-sensor wheel 1 to the camshaft 2 in a cost-effective, tight, non-rotatable and reliable manner.

The combined plug-sensor wheel 1 according to the invention can additionally comprise at a transition from the pin 4 to the sensor wheel 7 an undercut or a fillet radius 12 (see FIG. 2), as a result of which a notching effect can be reduced and a lifespan increased.

A further major advantage of the combined plug-sensor wheel 1 according to the invention is a reduced loading of the sensor wheel 7 when the pin 4 is pressed in. Compared with a separate plug produced as a cold extruded part, the combined plug-sensor wheel 1 according to the invention additionally has cost advantages.

At a free end of the pin 4, the same, i.e. the plug 8, can comprise an introduction chamfer 13 (see FIG. 2), which makes possible in particular introducing the pin 4 into the camshaft tube 6, in particular also without canting. Analogously, such an introduction chamfer can obviously be also arranged on the inner lateral surface at the longitudinal end of the camshaft tube 6.

With the combined plug-sensor wheel 1 according to the invention and the camshaft 2 according to the invention, a function integration of a sensor wheel formed separately to date and of a plug formed separately to date can be achieved, so that the combined plug-sensor wheel 1 according to the invention cannot only seal the interior 5 of the camshaft tube 6 of the camshaft 2 but via the sensor wheel 7 also detects an angle-of-rotation position. Altogether, by combining the plug 8 and the sensor wheel 7 to form the combined plug-sensor wheel 1, a reduction of the parts variety and connected with this a reduction of the storage and logistical costs as well as the assembly costs can also be achieved.

The invention claimed is:

1. A combined plug-sensor wheel for a camshaft, the plug-sensor wheel comprising:
   a sensor wheel; and
   a pin projecting axially from the sensor wheel, the pin configured to be inserted into a first end of the camshaft so as to seal the camshaft in a fluid-tight manner;
   wherein an undercut or a fillet radius is formed at a transition from the pin to the sensor wheel.

2. The plug-sensor wheel according to claim 1, wherein the plug-sensor wheel is composed of plastic, steel, or a sintered material.

3. The plug-sensor wheel according to claim 1, wherein an axial length of the pin is at least 20% and at most 40% of a diameter of the pin, and/or the axial length of the pin is at least 4 mm.

4. The plug-sensor wheel according to claim 1, wherein the pin is at least partially hollow.

5. The plug-sensor wheel according to claim 1, wherein the combined plug-sensor wheel is formed integrally.

6. The plug-sensor wheel according to claim 1, wherein an introduction chamfer is formed at a free end of the pin.

7. A camshaft, comprising:
   a plug-sensor wheel including:
      a sensor wheel; and
      a pin projecting axially from the sensor wheel, the pin configured to be inserted into a first end of the camshaft so as to seal the camshaft in a fluid-tight manner;
      wherein an undercut is formed at a transition from the pin to the sensor wheel.

8. The camshaft according to claim 7, wherein the camshaft and the plug-sensor wheel are pressed, bonded, press-fit stemmed, welded or soldered together.

9. The camshaft according to claim 7, wherein an axial length of the pin is at least 20% and at most 40% of a diameter of the pin.

10. The camshaft according to claim 7, wherein an axial length of the pin is at least 4 mm.

11. The camshaft according to claim 7, wherein the pin is at least partially hollow.

12. The camshaft according to claim 7, wherein an introduction chamfer is formed at a free end of the pin.

13. An internal combustion engine, comprising:
   at least one camshaft; and
   a plug-sensor wheel including:
      a sensor wheel; and
      a pin projecting axially from the sensor wheel, the pin configured to be inserted into a first end of the at least one camshaft so as to seal the at least one camshaft in a fluid-tight manner;
      wherein a fillet radius is formed at a transition from the pin to the sensor wheel.

14. The internal combustion engine according to claim 13, wherein the at least one camshaft and the plug-sensor wheel are pressed, bonded, press-fit stemmed, welded, or soldered together.

15. The internal combustion engine according to claim 13, wherein the pin is at least partially hollow.

16. The internal combustion engine according to claim 13, wherein an axial length of the pin is at least 20% and at most 40% of a diameter of the pin, and/or the axial length is at least 4 mm.

\* \* \* \* \*